United States Patent
Yagi et al.

(10) Patent No.: US 10,458,592 B2
(45) Date of Patent: Oct. 29, 2019

(54) DOUBLE TUBE (71) Applicant: FURUKAWA ELECTRIC CO., LTD., Tokyo (JP)

(72) Inventors: Masashi Yagi, Tokyo (JP); Hiroyuki Fukushima, Tokyo (JP); Tomohiro Takagi, Tokyo (JP); Makoto Furukawa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 82 days.

(21) Appl. No.: 15/784,331

(22) Filed: Oct. 16, 2017

(65) Prior Publication Data
US 2018/0051845 A1 Feb. 22, 2018

Related U.S. Application Data (63) Continuation of application No. PCT/JP2016/062422, filed on Apr. 19, 2016.

(30) Foreign Application Priority Data

Apr. 24, 2015 (JP) .................................. 2015-088990

(51) Int. Cl.
| | | |
|---|---|---|
| *F16L 59/075* | (2006.01) | |
| *F16L 59/065* | (2006.01) | |
| *H01B 12/16* | (2006.01) | |
| *F16L 9/02* | (2006.01) | |

(Continued)

(52) U.S. Cl.
CPC .............. *F16L 59/075* (2013.01); *F16L 9/02* (2013.01); *F16L 57/02* (2013.01); *F16L 59/065* (2013.01); *F16L 59/141* (2013.01); *F16L 59/143* (2013.01); *H01B 12/16* (2013.01); *Y02E 40/647* (2013.01)

(58) Field of Classification Search
CPC . F16L 59/075; F16L 9/02; F16L 57/02; F16L 59/065
See application file for complete search history.

(56) References Cited

U.S. PATENT DOCUMENTS

| | | | |
|---|---|---|---|
| 6,252,210 B1 * | 6/2001 | Schwarzkopf | .......... B29C 45/73 219/535 |
| 2015/0080225 A1 * | 3/2015 | Nomura | .................... H01R 4/68 505/231 |

(Continued)

FOREIGN PATENT DOCUMENTS

| | | |
|---|---|---|
| CN | 101368801 A | 2/2009 |
| CN | 202452016 U | 9/2012 |
| JP | 60-192198 | 9/1985 |

(Continued)

OTHER PUBLICATIONS

Combined Office Action and Search Report dated Sep. 3, 2018 in Chinese Patent Application No. 201680015780.4, citing documents AO and AP therein, 13 pages (with unedited computer generated English translation of the Office Action and English translation of categories of cited documents).

(Continued)

*Primary Examiner* — Paul A Wartalowicz
(74) *Attorney, Agent, or Firm* — Oblon, McClelland, Maier & Neustadt, L.L.P.

(57) ABSTRACT

A double tube is provided, which can reliably prevent buckling and flattening of an inner tube even when bending is performed.

11 Claims, 8 Drawing Sheets

(51) Int. Cl.
 *F16L 57/02* (2006.01)
 *F16L 59/14* (2006.01)

(56) References Cited

U.S. PATENT DOCUMENTS

2015/0097023 A1* 4/2015 Clement .............. B23K 1/0018
                                                  228/214
2016/0352027 A1* 12/2016 van der Laan .......... H01R 4/68

FOREIGN PATENT DOCUMENTS

| | | |
|---|---|---|
| JP | 62-015843 | 1/1987 |
| JP | 63-101594 | 5/1988 |
| JP | 08-208872 | 8/1996 |
| JP | 2000-120940 | 4/2000 |
| JP | 2008-121746 | 5/2008 |
| JP | 2012-141010 | 7/2012 |
| WO | WO 2013/179690 * 5/2013 | ............... H01R 4/68 |

OTHER PUBLICATIONS

International Search Report dated Aug. 2, 2016 in PCT/JP2016/062422 filed Apr. 19, 2016 (with English Translation).
Japan Notification of Reason s for Refusal of JP Patent Application No. 2017-505872 (with English Translation).
Japanese Office Action dated Oct. 10, 2017 in Japanese Patent Application No. 2017-505872 (with unedited computer generated English translation).
International Preliminary Report on Patentability and Written Opinion dated Oct. 24, 2017 in PCT/JP2016/062422 (with English translation).

* cited by examiner

DOUBLE TUBE

BACKGROUND OF THE INVENTION

Field of the Invention

The present invention relates to a double tube, and particularly relates to a double tube that has a double tube structure of an inner tube and an outer tube, and holds a space between the inner tube and the outer tube in vacuum.

Description of the Related Art

In general, as the insulating methods of insulated tubes, there are mainly two kinds that are a non-vacuum insulated tube and a vacuum insulated tube. A non-vacuum insulated tube is such that a tube is covered with a heat insulating material for cold reservation such as urethane foam, and non-vacuum insulated tubes are widely used as tubes for LNG, liquid oxygen and liquid nitrogen.

As a vacuum insulated tube, multilayer heat insulation and powder vacuum heat insulation are well known. Multilayer heat insulation is such that what is made by laminating an aluminum deposition film in layer and called super insulation is sealed, and is decompressed to high vacuum. Further, powder vacuum heat insulation is a structure in which powder with relatively low heat conduction such as pearlite and alumina powder is filled, and is evacuated to vacuum.

Here, in order to enhance strength of a vacuum insulated tube, there has been conventionally disclosed an art using a tube that is constituted of an outer tube and an inner tube that is inserted into the outer tube, keeps a space formed between the outer tube and the inner tube in vacuum, and is formed by a corrugating processing to cause the outer tube to have continuous arcs in R shapes to outside to swell outward (refer to Japanese Patent Laid-Open No. 2000-120940, for example).

Further, there has been conventionally disclosed a heat insulation pipe in which a copper tube is covered with a crosslinked polyolefin resin foam sheet formed by crosslinking and foaming a resin composition (refer to Japanese Patent Laid-Open No. 08-208872, for example).

SUMMARY OF THE INVENTION

However, in the art of Japanese Patent Laid-Open No. 2000-120940, the inner tube is constituted of a flat tube, and therefore it is difficult to bend, and when bending is performed when the vacuum insulated tube is laid, the state of the inner tube cannot be confirmed from outside, so that Japanese Patent Laid-Open No. 2000-120940 has the problem that even if the outer tube can be properly bent, buckling and flattening of the inner tube is likely to be caused.

Further, in the art of Japanese Patent Laid-Open No. 08-208872, the foamed body is formed from a resin, and therefore has the problem of deteriorating by use for a long time period, and decreasing heat insulation performance. Further, the foamed body has low strength, and therefore has the problem that flaws and dents are easily generated and this leads to a decrease in heat insulation performance.

The present invention is made in the light of the aforementioned points, and an object of the present invention is to provide a double tube that can reliably prevent buckling and flattening of the inner tube even when bending is performed.

In order to attain the above described object, a double tube according to the present invention includes an inner tube, and an outer tube disposed outside the inner tube, wherein the inner tube is constituted of a flat tube formed from copper or a copper alloy, and the outer tube is constituted of a corrugated tube formed from any one of iron, stainless steel, aluminum and an aluminum alloy.

According to the configuration, the inner tube is constituted of the flat tube formed from copper or a copper alloy, the outer tube is constituted of the corrugated tube formed from any one of iron, stainless steel, aluminum and an aluminum alloy, and the outer tube is formed from a different metal from that of the inner tube, so that bending of the inner tube is facilitated, the pressure loss of the inner tube can be decreased, and stagnation of the internal fluid can be prevented.

Further, the present invention is such that in the above described configuration, the inner tube is formed from brass.

According to the configuration, the inner tube is formed from brass, so that bending of the inner tube can be easily performed than the outer tube, and at the time of bending the outer tube, buckling and flattening of the inner tube can be prevented.

Further, the present invention is such that in the aforementioned configuration, a repetitive bending diameter d of the inner tube is formed to be smaller than a repetitive bending diameter D of the outer tube.

According to the configuration, the repetitive bending diameter d of the inner tube is formed to be smaller than the repetitive bending diameter D of the outer tube, so that in the case of laying the double tube, by performing bending of the outer tube with the repetitive bending diameter or more, the inner tube is always formed with the repetitive bending diameter or more, as a result of which, it becomes possible to reliably prevent buckling and flattening of the inner tube.

Further, the present invention is such that in the aforementioned configuration, a repetitive bending diameter d of the inner tube is 500 mm or more.

According to the configuration, the repetitive bending diameter d of the inner tube is set as 500 mm or more, so that even when repetitive bending deformation is applied 3000 times, flattening of the inner tube does not occur, and it becomes possible to keep mechanical performance of the inner tube.

Further, the present invention is such that in the aforementioned configuration, a terminal member that seals a space between the inner tube and the outer tube is provided at an end portion of the inner tube and at an end portion of the outer tube, the terminal member includes an intermediate cylinder portion having a smaller outside diameter than an outside diameter of the outer tube, and an outer periphery of at least the intermediate cylinder portion of the terminal member is covered with a heat insulating material.

According to the configuration, the terminal member is provided at the end portion of the inner tube and at the end portion of the outer tube, the terminal member includes the intermediate cylinder portion having the outside diameter smaller than the outside diameter of the outer tube, the outer periphery of the terminal member is covered with the heat insulating material, so that the long heat transmission path between the outer tube and the inner tube can be ensured, and heat penetration to the inner tube from the outer tube can be decreased. Further, the heat insulating material provided on the outer periphery of the terminal member and the outer circumferential surface of the outer tube can be finished to be smooth, and in addition, shifting of the heat insulating material can be prevented.

Further, the present invention is such that in the aforementioned configuration, an end portion connection tube is connected to the end portion of the outer tube, each of the end portion connection tube and the intermediate cylinder portion is constituted of a flat tube, and the intermediate cylinder portion and the end portion connection tube are connected by a ring-shaped terminal portion, and the intermediate cylinder portion and the inner tube are connected by a ring-shaped terminal portion, respectively.

According to the configuration, in the terminal member, a level difference is formed by the intermediate cylinder portion to the outside diameters of the outer tube and the end portion connection tube, and the temperature of the outer tube can be transmitted to the inner tube via the end portion connection tube, the outer tube terminal portion, the intermediate cylinder portion and the inner tube terminal portion, so that the long heat transmission path from the outer tube to the inner tube can be ensured, and it becomes possible to reduce heat penetration to the inner tube from the outer tube that is normally under an outside temperature.

Further, the present invention is such that in the aforementioned configuration, the terminal portion that connects the inner tube and the intermediate cylinder portion has a cutout formed in an end portion inner circumferential surface, and the inner tube and the terminal portion are connected by filling the cutout with a brazing material.

According to the configuration, the inner tube and the terminal portion are connected by filling the cutout with the brazing material, so that the brazing material flows into the space between the inner periphery of the terminal portion and the outer periphery of the inner tube, which is formed by the cutout, whereby it becomes possible to firmly connect the inner tube and the terminal portion which are formed from different materials.

Further, the present invention is such that in the aforementioned configuration, the terminal member includes an insulating member that electrically insulates the inner tube and the outer tube in the intermediate cylinder portion.

According to the configuration, the terminal member includes the insulating member that electrically insulates the inner tube and the outer tube in the portion of the level difference formed by the intermediate cylinder portion, so that a voltage can be applied to the inner tube by the insulating member.

Further, the present invention is such that in the aforementioned configuration, at least one of both end portions of the inner tube include a current terminal that supplies electricity to the inner tube.

According to the configuration, the current terminal is provided at least one of both end portions of the inner tube, and the current terminal which supplies electricity to the inner tube is included, so that a current can be passed to the inner tube by energizing the current terminal of the inner tube.

Further, the present invention is such that in the aforementioned configuration, a superconducting wire is integrally provided on a periphery of the inner tube, a refrigerant having a critical current temperature of superconductivity or less is caused to flow inside of the inner tube, and a current is passed into the superconducting wire via the current terminal.

According to the configuration, the superconducting wire is integrally provided on the periphery of the inner tube, in the inner tube, the refrigerant having the critical current temperature of the superconductivity or less is caused to flow, and the current is passed into the superconducting wire via the current terminal, so that when the temperature of the refrigerant has the critical current temperature of the superconducting wire or less, the superconducting wire is commutated to superconductivity, and a large current can be passed into the superconducting wire with resistance of zero. In this case, commutation of the superconducting wire to superconductivity is automatically performed in accordance with the temperature of the refrigerant, so that it is not necessary to always continue to cause the refrigerant to flow, and control of the temperature and pressure is not needed.

Further, the present invention is such that in the aforementioned configuration, a space between the inner tube and the outer tube is held in vacuum.

According to the configuration, the space between the inner tube and the outer tube are held in vacuum, so that both the vacuum heat insulation effect of the double tube and the performance of the electric power cable can be properly exhibited.

Further, the present invention is such that in the aforementioned configuration, a degree of vacuum of the space between the inner tube and the outer tube is set at 1 Pa or less.

According to the configuration, the space between the inner tube and the outer tube is held in vacuum of 1 Pa or less, so that both the vacuum heat insulation effect of the double tube and the performance of the electric power cable can be properly exhibited.

Further, the present invention is such that in the aforementioned configuration, the fluid that is caused to flow in the inner tube is a heating medium.

According to the configuration, the fluid that is caused to flow in the inner tube is the heating medium, so that the double tube can be used as a heat exchanger transport tube for an air-conditioner.

Note that the entire contents of Japanese Patent Application No. 2015-088990 filed in Apr. 24, 2015 are incorporated in the specification.

According to the present invention, bending of the inner tube is facilitated, the pressure loss of the inner tube can be decreased, and stagnation of the internal fluid can be prevented. Further, by performing bending of the outer tube with the repetitive bending diameter or more when the double tube is laid, the inner tube is always formed with the repetitive bending diameter or more, as a result of which, it becomes possible to reliably prevent buckling and flattening of the inner tube. Further, the long heat transmission path between the outer tube and the inner tube can be ensured, and heat penetration to the inner tube from the outer tube can be decreased. Further, the heat insulating material provided on the outer periphery of the terminal member and the outer circumferential surface of the outer tube can be finished to be smooth, and in addition, shifting of the heat insulating material can be prevented.

Further, a voltage can be applied to the inner tube by the insulating member, a current can be caused to flow in the inner tube by energizing the current terminals of the inner tube, and when the temperature of the inner tube is reduced by causing the refrigerant to flow in the inner tube, the amount of the current which can be passed in the inner tube can be increased. Further, when the temperature of the refrigerant becomes the critical current temperature of the superconducting wire or less, the superconducting wire is commutated to superconductivity, and a large current can be passed in the superconducting wire with the resistance of zero.

DETAILED DESCRIPTION OF THE PREFERRED EMBODIMENTS

Hereunder, embodiments of the present invention will be described with reference to the drawings.

Figure 1:
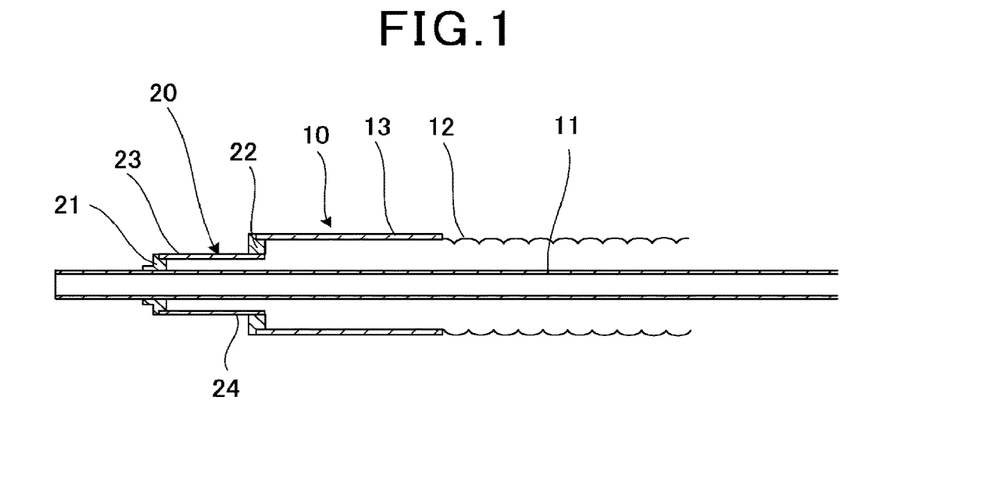
FIG. 1 is a schematic configuration view illustrating a first embodiment of a double tube according to the present invention.
Figure 2:
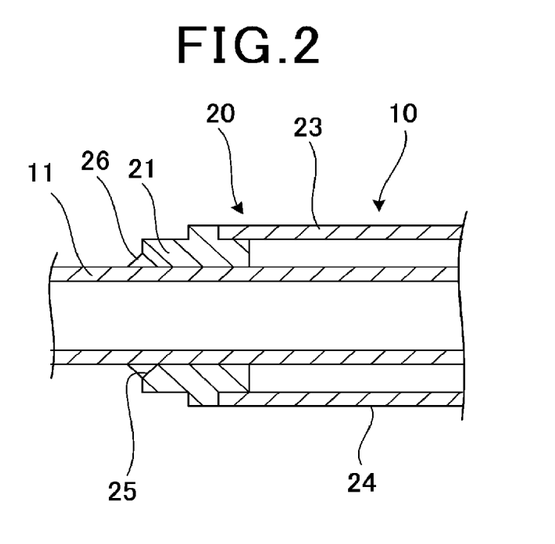
FIG. 2 is an enlarged view of an inner tube end portion in FIG. 1.

FIG. 1 is a schematic perspective view illustrating a first embodiment of a double tube according to the present invention. FIG. 2 is an enlarged view of an inner tube end portion in FIG. 1. Note that in the present embodiment, an example of a case in which a vacuum insulated tube is applied as a double tube is described.

In the present embodiment, a vacuum insulated tube 10 is constituted of a double tube formed of an inner tube 11 and an outer tube 12. The inner tube 11 is constituted of a flat tube of brass or pure copper capable of being bent, for example. Here, the reason why the copper tube is used is that the copper tube has corrosion resistance, is easily plumbed, is light, has a smooth inner surface and has small friction resistance, and therefore less scale is attached during use, so that pressure loss decreases.

As a kind of copper, brass and pure copper are favorable, and pure copper with low possibility of a dezincing phenomenon and stress corrosion cracking is more preferable. Further, of pure copper, phosphorous de-oxidized copper excellent in hydrogen embrittlement, on which a brazing material favorably spreads is more preferable.

Further, the outer tube 12 is constituted of a corrugated tube in which a wave is formed on a surface. As the outer tube 12, for example, SUS (stainless steel), SS (rolled steel for general structure), and Al (aluminum) are used. Further, SUS is more preferable from the viewpoint of high corrosion resistance and being capable of forming a wall thickness to be thin.

An end portion connection tube 13 is connected to an end portion of the outer tube 12. The end portion connection tube 13 is constituted of a flat tube formed from the material of SUS, SS or Al similarly to the outer tube 12.

Further, a thickness dimension of the inner tube 11 is 0.3 mm to 1.2 mm, and an outside diameter of the inner tube 11 is formed to be 4 mm to 23 mm. A thickness dimension of the outer tube 12 is 0.3 mm to 0.8 mm, an outside diameter of the outer tube 12 is 10 mm to 50 mm, a corrugating pitch of the corrugated tube of the outer tube 12 is formed to be 4 mm to 12 mm.

In general, there are buckling and flattening as the problems in the case of bending a flat tube formed from copper. In order to prevent buckling and flattening from occurring at the time of bending like this, a special bender is used at a time of bending the flat tube formed from copper, and a bending diameter is set at eight times as large as the outside diameter with thinning of a flat tube outer circumferential portion taken into consideration.

When the outside diameter of a long flat tube formed from copper is set at 19 mm to 22.23 mm, a maximum bending diameter at this time is 152 mm to 178 mm. However, if bending is performed to the maximum bending diameter by the special bender in this way, the flat tube cannot be restored to the original straight tube.

Thus, in the present embodiment, the inner tube 11 and the outer tube 12 are formed so that a repetitive bending diameter d of the inner tube 11 and a repetitive bending diameter D of the outer tube 12 satisfy d<D.

Here, the repetitive bending diameter refers to a diameter of bending with fatigue frequency of 3000 times at the time of repeating a straight shape and bending deformation. That is, the repetitive bending diameter is a diameter with which the tube can be returned to be the straight shape after being subjected to a bending history of 3000 times, and can keep mechanical performance.

Since in the vacuum insulated tube 10 formed of a double tube, the inner tube 11 cannot be visually recognized from outside, presence or absence of buckling and flattening that occur to the inner tube 11 cannot be confirmed, but the repetitive bending diameter d of the inner tube 11 is formed to be smaller than the repetitive bending diameter D of the outer tube 12, and laying work and bending of the outer tube 12 are performed with the repetitive bending diameter or more, whereby the inner tube 11 is always formed with the repetitive bending diameter or more, as a result of which, it becomes possible to reliably prevent buckling and flattening of the inner tube 11.

Figure 3:
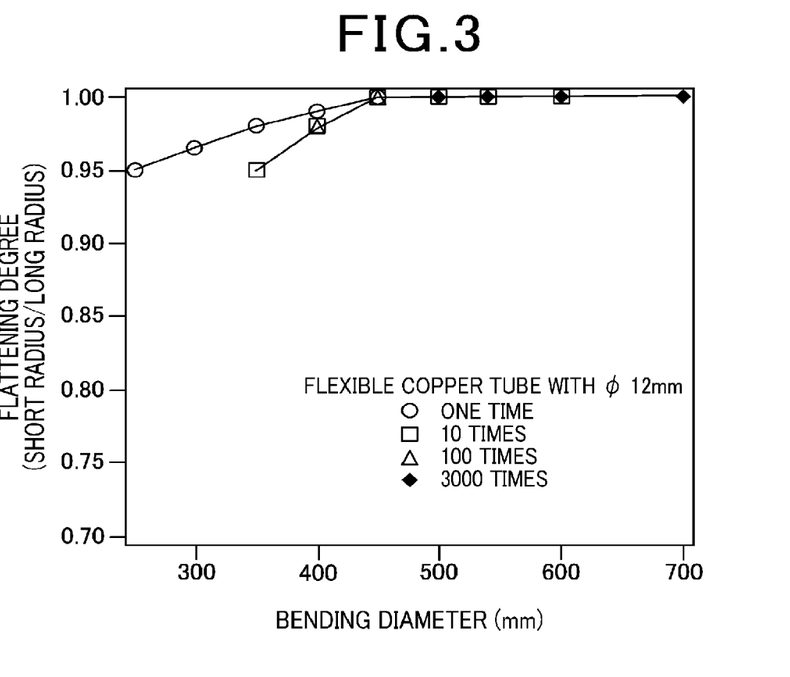
FIG. 3 is a graph illustrating a result of measuring a ratio of a short radius and a long radius of a copper tube in a case in which bending is repeatedly performed, with respect to the copper tube with a diameter of 12 mm.
Figure 4:
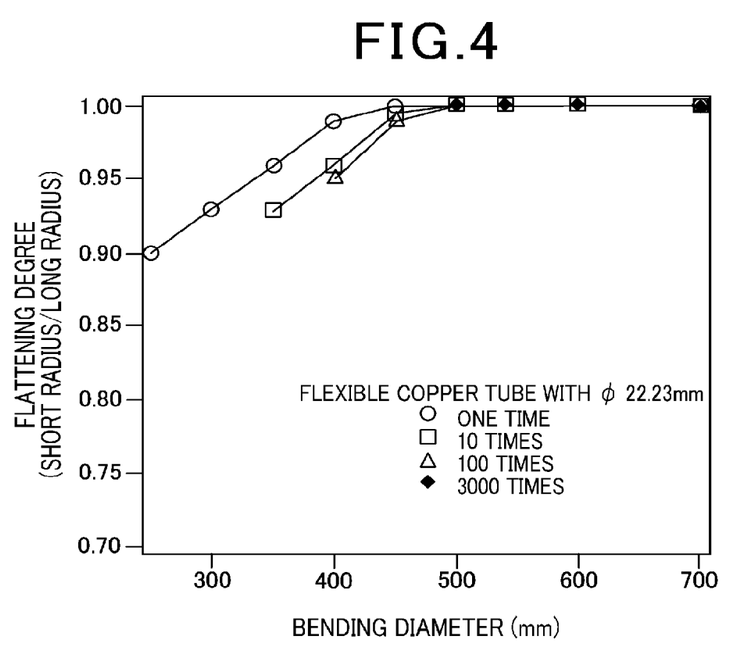
FIG. 4 is a graph illustrating a result of measuring a ratio of a short radius and a long radius of a copper tube in a case in which bending is repeatedly performed, with respect to the copper tube with a diameter of 22.23 mm.

FIG. 3 and FIG. 4 are graphs illustrating results of measuring ratios of short radiuses and long radiuses in outside diameters of copper tubes at time of numbers of times of repetition being one, 10, 100 and 3000 by repeatedly performing bending deformation from the straight shapes, with respect to flexible copper tubes respectively having a diameter of 12 mm and a diameter of 22.23 mm, and wall thicknesses of 0.3 to 1.2 mm. Here, a bending diameter in a horizontal axis is such that, for example, in the case of the bending diameter of 500 mm, a disk having a diameter of 500 mm is prepared, and the tube is subjected to bending deformation along an outer circumference of the disk, and the long radius and short radius are measured in a state in which the tube is returned to the straight shape.

Note that when short radius/long radius=1 is established, the shape is circular, which shows that the tube returns to the original straight tube.

Figure 5:
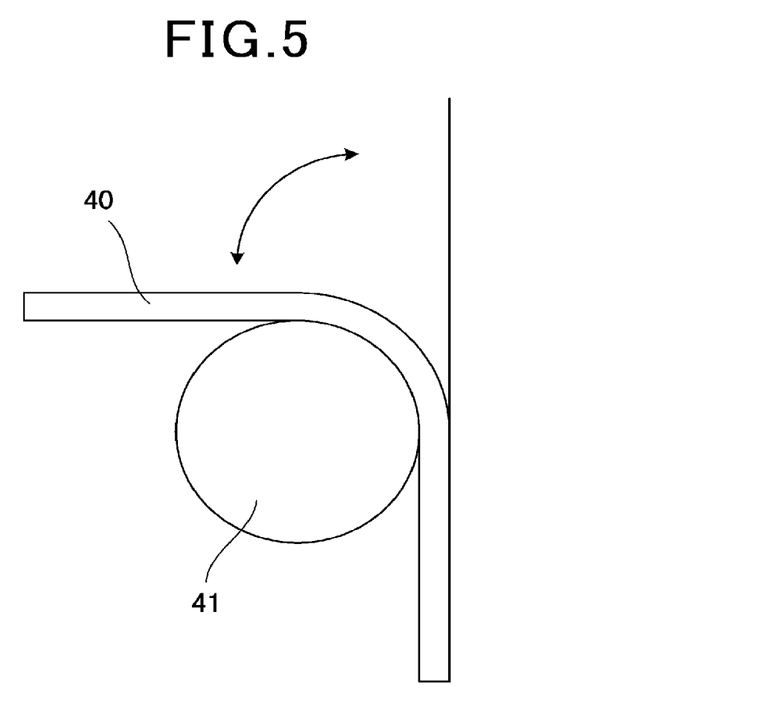
FIG. 5 is a schematic view illustrating a test method of bending deformation of a flexible copper tube.

FIG. 5 is a schematic view illustrating a test method of bending deformation of the flexible copper tube.

The bending deformation test of a flexible copper tube 40 is such that as illustrated in FIG. 5, the straight copper tube 40 is bent 90° to be along an outer periphery of a circular bending member 41, and when the copper tube 40 is returned to the straight shape again, the number of times of bending deformation is counted as one time.

As illustrated in FIG. 3 and FIG. 4, according to a measurement result, it is found that if the diameter is 500 mm or more, flattening of the copper tube 40 does not occur even when the repetitive bending deformation is applied 3000 times. That is, as for the copper tube 40, it becomes possible to keep mechanical performance without a problem if the repetitive bending diameter is 500 mm or more.

Further, as illustrated in FIG. 1, a terminal member 20 for sealing the space between the inner tube 11 and the outer tube 12 is attached to an end portion of the vacuum insulated tube 10.

The terminal member 20 is constituted of a ring-shaped inner tube terminal portion 21 fixedly attached to an outer circumferential surface of the inner tube 11, a ring-shaped outer tube terminal portion 22 that is fixedly attached to an end surface of an end portion connection tube 13, and an intermediate cylinder portion 23 that connects an outside diameter portion of the inner tube terminal portion 21 and an inside diameter portion of the outer tube terminal portion 22, and has an intermediate diameter between the outside diameter and the inside diameter. The inner tube terminal portion 21, the outer tube terminal portion 22 and the intermediate cylinder portion 23 are formed of stainless steel such as SUS, for example.

Thereby, in the terminal member 20, a level difference 24 is formed by the intermediate cylinder portion 23 with respect to the outside diameter of the outer tube 12, and the temperature of the outer tube 12 is transmitted to the inner tube 11 via the outer tube terminal portion 22, the intermediate cylinder portion 23 and the inner tube terminal portion 21, so that a long heat transmission path from the outer tube 12 to the inner tube 11 can be ensured, and it becomes possible to decrease heat penetration to the inner tube 11 from the outer tube 12 which is normally under an outside temperature.

As illustrated in FIG. 2, in the present embodiment, a cutout 25 formed by cutting out a corner portion is formed in an end portion inner circumferential surface of the inner tube terminal portion 21. By applying brazing by a brazing material 26 such as silver solder to the inner circumferential portion of the end portion of the inner tube terminal portion 21, the inner tube 11 and the inner tube terminal portion 21 are connected.

The brazing material 26 flows into a space between an inner periphery of the inner tube terminal portion 21 and the outer periphery of the inner tube 11, which is formed by the cutout 25, whereby it becomes possible to firmly connect the inner tube formed from a copper material and the inner tube terminal portion 21 formed from a stainless material.

Note that the inner tube terminal portion 21 and the intermediate cylinder portion 23 are connected by welding, the intermediate cylinder portion 23 and the outer tube terminal portion 22 are connected by welding, and the outer tube terminal portion 22 and the end portion connection tube 13 are connected by welding, respectively.

Further, when the inner tubes 11 are connected, there are generally means for connecting end portions of the inner tubes 11 by using a tube connector, and means for connecting by welding and brazing. In a connection spot of the inner tubes 11, a heat insulating material is wound on an outer periphery of the intermediate cylinder portion 23, and heat penetration to the inner tube 11 is prevented.

In this case, in the present embodiment, the intermediate cylinder portion 23 having a smaller outside diameter than the outside diameter of the outer tube 12 is provided at the terminal member 20, so that the heat insulating material and the outer circumferential surface of the outer tube 12 can be finished to be smooth by forming the outside diameter of the heat insulating material which is wound on the outer periphery of the intermediate cylinder portion 23 to be the same as the outside diameter of the outer tube 12, and a side edge of the heat insulating material is pressed by the outer tube terminal portion 22, so that shifting of the heat insulating material and the like can be also prevented.

An operation of the present embodiment will be described next.

The vacuum insulated tube 10 in the present embodiment is used in the state in which the space between the inner tube 11 and the outer tube 12 is kept in vacuum, for example. The degree of vacuum of the space between the inner tube 11 and the outer tube 12 is set at 1 Pa or less, for example. Further, as a fluid that is caused to flow in the inner tube 11, for example, a heating medium such as a refrigerant of an air-conditioner, liquefied gas such as a liquid nitrogen, gas such as natural gas and the like are used.

In the present embodiment, the repetitive bending diameter d of the inner tube 11 and the repetitive bending diameter D of the outer tube 12 are formed so as to satisfy $d<D$, so that by performing bending of the outer tube 12 with the repetitive bending diameter or more when the vacuum insulated tube 10 is laid, the inner tube 11 is always formed with the repetitive bending diameter or more, as a result of which, it becomes possible to prevent buckling and flattening of the inner tube 11 reliably.

As described above, the present embodiment includes the inner tube 11, and the outer tube 12 that is disposed outside the inner tube 11, the inner tube 11 is constituted of a flat tube formed from copper or a copper alloy, and the outer tube 12 is constituted of a corrugated tube formed of any one of iron, stainless steel, aluminum and an aluminum alloy.

According to this, the pressure loss of the inner tube 11 can be decreased, and stagnation of the internal fluid can be prevented.

Further, in the present embodiment, the inner tube 11 is formed of brass.

According to this, bending of the inner tube 11 is made more easily than the outer tube 12, and when the outer tube 12 is bent, buckling and flattening of the inner tube 11 can be prevented.

Further, in the present embodiment, the repetitive bending diameter d of the inner tube 11 is formed to be smaller than the repetitive bending diameter D of the outer tube 12.

According to this, by performing bending of the outer tube 12 with the repetitive bending diameter or more when the double tube is laid, the inner tube 11 is always formed with the repetitive bending diameter or more, as a result of which, it becomes possible to prevent buckling and flattening of the inner tube 11 reliably.

Further, in the present embodiment, the repetitive bending diameter d of the inner tube 11 is 500 mm or more.

According to this, it becomes possible to keep mechanical performance of the inner tube 11 without occurrence of flattening of the inner tube 11 even when repetitive bending deformation is applied 3000 times.

Further, in the present embodiment, the terminal member 20 which seals the space between the inner tube 11 and the outer tube 12 is provided at an end portion of the inner tube 11 and at the end portion of the outer tube 12, the terminal member 20 includes the intermediate cylinder portion 23 having the smaller outside diameter than the outside diameter of the outer tube 12, and the outer periphery of at least the intermediate cylinder portion 23 of the terminal member 20 is covered with the heat insulating material 34.

According to this, the long heat transmission path between the outer tube 12 and the inner tube 11 can be ensured, and heat penetration to the inner tube 11 from the outer tube 12 can be decreased. Further, a heat insulating material 34 provided on the outer periphery of the terminal member 20 and the outer circumferential surface of the outer tube 12 can be finished to be smooth, and in addition, shifting of the heat insulating material 34 can be prevented.

Further, in the present embodiment, the end portion connection tube 13 is connected to the end portion of the outer tube 12, and the end portion connection tube 13 and the intermediate cylinder portion 23 are constituted of flat tubes. The intermediate cylinder portion 23 and the end portion connection tube 13 are connected by the ring-shaped inner tube terminal portion 21, and the intermediate cylinder portion 23 and the inner tube 11 are connected by the outer tube terminal portion 22, respectively.

According to this, in the terminal member 20, the level difference 24 is formed by the intermediate cylinder portion 23 to the outside diameters of the outer tube 12 and the end portion connection tube 13, and the temperature of the outer tube 12 is transmitted to the inner tube 11 via the end portion connection tube 13, the outer tube terminal portion 22, the intermediate cylinder portion 23 and the inner tube terminal portion 21, so that the long heat transmission path to the inner tube 11 from the outer tube 12 can be ensured, and it becomes possible to decrease heat penetration to the inner tube 11 from the outer tube 12 that is normally under the outside temperature.

Further, in the present embodiment, in the inner tube terminal portion 21 (the terminal portion) connecting the inner tube 11 and the intermediate cylinder portion 23, the cutout 25 is formed in the end portion inner circumferential surface, and the inner tube 11 and the inner tube terminal portion 21 are connected by filling the cutout 25 with the brazing material.

According to this, the brazing material flows into the space between the inner periphery of the inner tube terminal portion 21 and the outer periphery of the inner tube 11, which is formed by the cutout 25, and thereby it becomes possible to firmly connect the inner tube 11 and the inner tube terminal portion 21 which are formed from different materials.

A second embodiment of the present invention will be described next.

Figure 6:
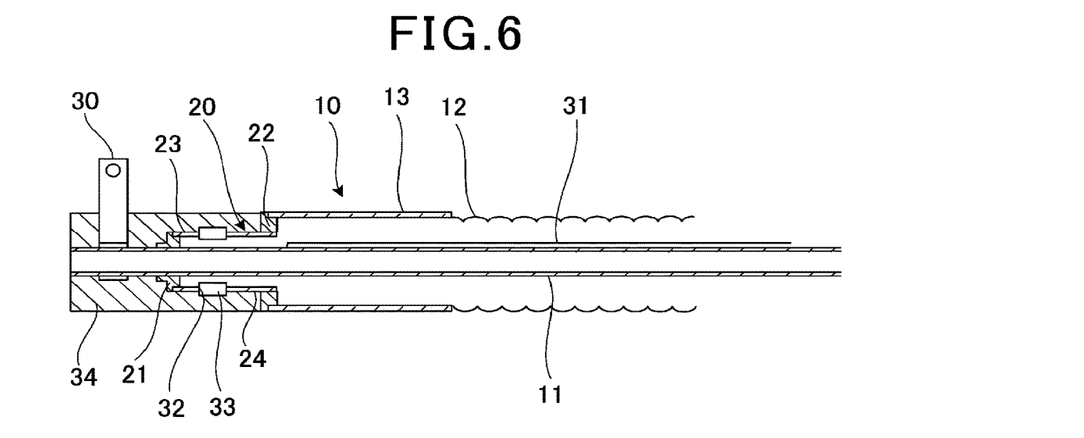
FIG. 6 is a schematic configuration view illustrating a second embodiment of the present invention.

FIG. 6 is a schematic configuration view illustrating the second embodiment of the present invention.

In the present embodiment, a current terminal 30 is connected to at least one of both end portions of the inner tube 11. Further, in the present embodiment, a superconducting wire 31 is wound on the outer periphery of the inner tube 11. Note that a metal (not illustrated) is wound on the outer periphery of the inner tube 11, and the superconducting wire 31 may be wound on the outer periphery of the metal.

Further, in the intermediate cylinder portion 23 of the terminal member 20, an insulating slit 32 is continuously formed in a circumferential direction, and a ring-shaped insulating member 33 is provided in the insulating slit 32. The insulating member 33 is configured to electrically insulate the inner tube 11 and the outer tube 12.

Further, the heat insulating material 34 is provided on the outer peripheral portions of the current terminal 30 of the inner tube 11 and the insulating member 33 of the terminal member 20. An outer circumferential surface of the heat insulating material 34 is formed to be flush with the outer circumferential surface of the outer tube 12.

The other configurations are similar to those in the first embodiment, so that the same components are assigned with the same reference signs, and explanation thereof will be omitted.

Figure 7:
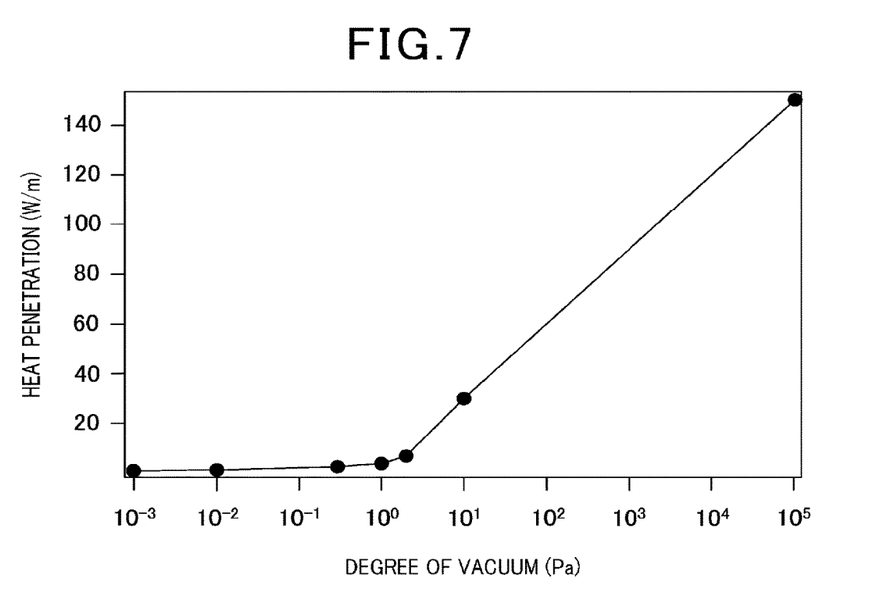
FIG. 7 is a graph illustrating heat penetration to a degree of vacuum.

Further, FIG. 7 is a graph illustrating heat penetration to the degree of vacuum. As illustrated in FIG. 7, it is found that when the degree of vacuum is 1 Pa or less, the penetration heat is 10 W/m or less, and is extremely low. It is found that when the degree of vacuum exceeds 10 Pa, heat penetration becomes 30 W/m or more, heat penetration becomes large.

Figure 8:
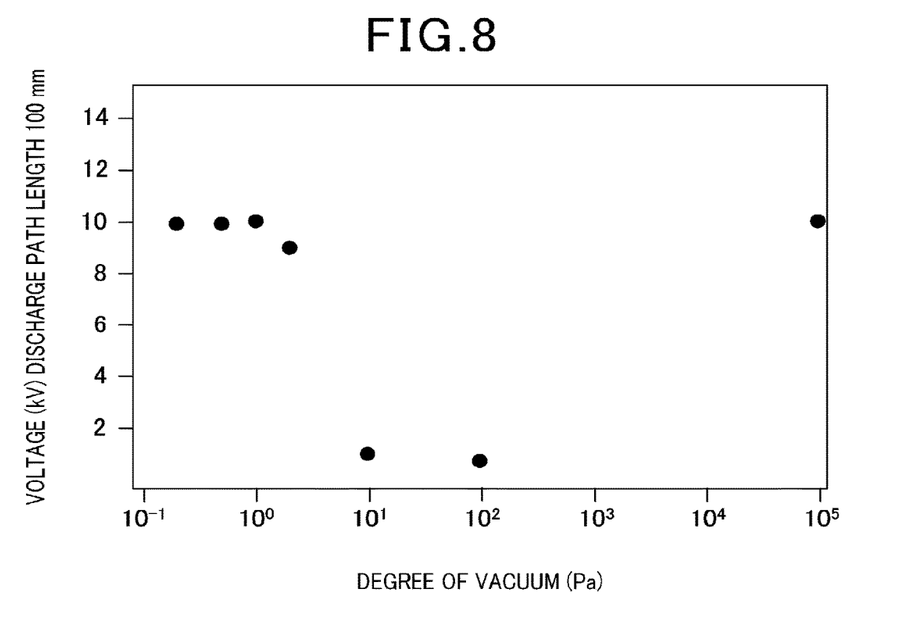
FIG. 8 is a graph illustrating a voltage at a time of a discharge path length to the degree of vacuum being set at 100 mm.

Further, FIG. 8 is a graph illustrating a voltage at the time of a discharge path length being set as 100 mm to the degree of vacuum. As illustrated in FIG. 8, it is found that when the degree of vacuum is 1 Pa or less, the discharge path length extends, and when the degree of vacuum is 10 Pa to 100 Pa, the discharge path length becomes a minimum.

Accordingly, in order to exhibit both a vacuum heat insulating effect of the vacuum insulated tube 10 and performance of the electric power cable properly, it is necessary to set the degree of vacuum at 1 Pa or less.

In the present embodiment, the current terminal 30 is attached to the inner tube 11, so that a current can be caused to flow in the inner tube 11 by energizing the current terminal 30.

Further, the inner tube 11 and the outer tube 12 are electrically insulated by the insulating member 33, so that it also becomes possible to apply a voltage to the inner tube 11 via the current terminal 30, and in this case, the inner tube 11 functions as the electric power cable.

In this case, by passing the refrigerant in the inner tube 11, the temperature of the inner tube 11 is reduced by the refrigerant, and therefore an allowable current increases, so that it becomes possible to increase an amount of current that can be passed in the inner tube 11.

Further, when the temperature of the refrigerant becomes Tc (a critical current temperature) or less of the superconducting wire 31, the superconducting wire 31 is commutated to superconductivity, and it becomes possible to pass a large current to the superconducting wire 31 with resistance of zero.

In this case, commutation to superconductivity of the superconducting wire 31 is automatically performed in accordance with the temperature of the refrigerant, so that it is not necessary to always continue to pass the refrigerant, or control of the temperature and the pressure is not necessary.

As described above, in the present embodiment, the terminal member 20 includes the insulating member 33 that electrically insulates the inner tube 11 and the outer tube 12 in the intermediate cylinder portion 23.

According to this, the current can be passed in the inner tube 11 by energizing the current terminal 30 at the inner tube 11, and when the temperature of the inner tube 11 is reduced by causing the refrigerant to flow in the inner tube 11, it becomes possible to increase the amount of a current that can be passed in the inner tube 11.

Further, the inner tube 11 and the outer tube 12 are electrically insulated by the insulating member 33, so that it becomes possible to apply a voltage to the inner tube 11, and the inner tube 11 can be caused to function as the electric power cable.

Further, in the present embodiment, at least one of both end portions of the inner tube 11 include the current terminal 30 that supplies a current to the inner tube 11.

According to this, a current can be passed into the inner tube by energizing the current terminal 30 of the inner tube 11.

Each of both end portions of the inner tube may include a current terminal that supplies electricity to the inner tube.

Further in the present embodiment, the superconducting wire 31 is integrally provided on the periphery of the inner tube 11, the refrigerant having the critical current temperature of superconductivity or less is caused to flow inside the inner tube 11, and the current is passed into the superconducting wire 31 via the current terminal 30.

According to this, when the temperature of the refrigerant becomes Tc (a commutation temperature) of the superconducting wire 31 or less, the superconducting wire 31 is commutated to superconductivity, and a large current can be passed into the superconducting wire 31 with the resistance of zero. In this case, commutation of the superconducting wire 31 to superconductivity is performed automatically in accordance with the temperature of the refrigerant, so that it is not necessary to always continue to cause the refrigerant to flow, and control of the temperature and pressure becomes unnecessary.

Note that the present invention is not limited to the aforementioned respective embodiments, and can be arbitrarily changed within the range without departing from the gist of the invention.

REFERENCE SIGNS LIST

10 Vacuum insulated tube
11 Inner tube
12 Outer tube
13 End portion connection tube
20 Terminal member
21 Inner tube terminal portion
22 Outer tube terminal portion
23 Intermediate cylinder portion
24 Level difference
25 Cutout
30 Current terminal
31 Superconducting wire
32 Insulating slit
33 Insulating member
34 Heat insulating material

What is claimed is:

1. A double tube, comprising;
an inner tube, and
an outer tube disposed outside the inner tube,
wherein the inner tube is constituted of a flat tube formed from copper or a copper alloy, and the outer tube is constituted of a corrugated tube formed from any one of iron, stainless steel, aluminum and an aluminum alloy,
wherein a terminal member that seals a space between the inner tube and the outer tube is provided at an end portion of the inner tube and at an end portion of the outer tube, the terminal member includes an intermediate cylinder portion having a smaller outside diameter than an outside diameter of the outer tube,
an outer periphery of at least the intermediate cylinder portion of the terminal member is covered with a heat insulating material,
wherein an end portion connection tube is connected to the end portion of the outer tube, each of the end portion connection tube and the intermediate cylinder portion is constituted of a flat tube, the intermediate cylinder portion and the end portion connection tube are connected by a ring-shaped terminal portion, and the intermediate cylinder portion and the inner tube are connected by a ring-shaped terminal portion, respectively,
wherein the terminal portion that connects the inner tube and the intermediate cylinder portion has a cutout formed in an end portion inner circumferential surface, and the inner tube and the terminal portion are connected by filling the cutout with a brazing material, and
wherein the inner tube is inserted so as to directly contact with the end portion inner circumferential surface of the terminal portion.

2. The double tube according to claim 1,
wherein the terminal member includes an insulating member that is located in the intermediate cylinder portion and electrically insulates the inner tube and the outer tube.

3. The double tube according to claim 2,
wherein at least one of both end portions of the inner tube include a current terminal that supplies electricity to the inner tube.

4. The double tube according to claim 3,
wherein a superconducting wire is integrally provided on a periphery of the inner tube, a refrigerant having a critical current temperature of superconductivity or less is caused to flow inside of the inner tube, and a current is passed into the superconducting wire via the current terminal.

5. The double tube according to claim 1,
wherein a space between the inner tube and the outer tube is held in vacuum.

6. The double tube according to claim 5,
wherein a degree of vacuum of the space between the inner tube and the outer tube is set at 1 Pa or less.

7. The double tube according to claim 1,
wherein the inner tube is formed from brass.

8. The double tube according to claim 1,
wherein a repetitive bending diameter d of the inner tube is formed to be smaller than a repetitive bending diameter D of the outer tube.

9. The double tube according to claim 1,
wherein a repetitive bending diameter d of the inner tube is 500 mm or more.

10. The double tube according to claim 1,
wherein a fluid that is caused to flow in the inner tube is a heating medium.

11. A double tube, comprising;
an inner tube, and
an outer tube disposed outside the inner tube,
wherein the inner tube is constituted of a flat tube formed from copper or a copper alloy, and the outer tube is constituted of a corrugated tube formed from any one of iron, stainless steel, aluminum and an aluminum alloy,
wherein a terminal member that seals a space between the inner tube and the outer tube is provided at an end portion of the inner tube and at an end portion of the outer tube, the terminal member includes an intermediate cylinder portion having a smaller outside diameter than an outside diameter of the outer tube,
wherein the intermediate cylinder portion and the inner tube are connected by a ring-shaped terminal portion, and
wherein the terminal portion that connects the inner tube and the intermediate cylinder portion has a cutout formed in an end portion inner circumferential surface, and
the inner tube and the terminal portion are connected by filling the cutout with a brazing material.

\* \* \* \* \*